United States Patent Office 2,873,122
Patented Feb. 10, 1959

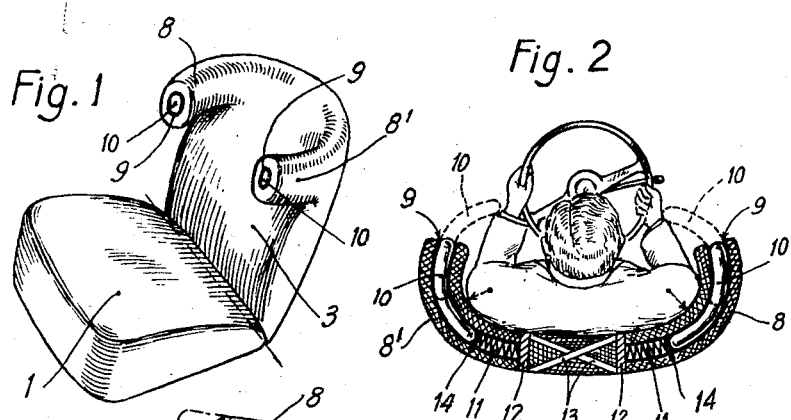
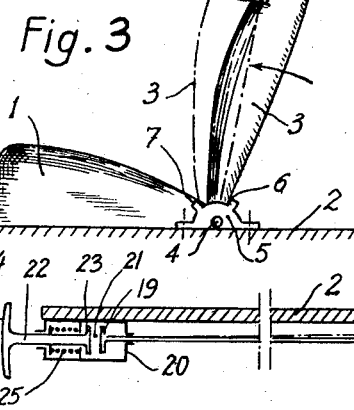
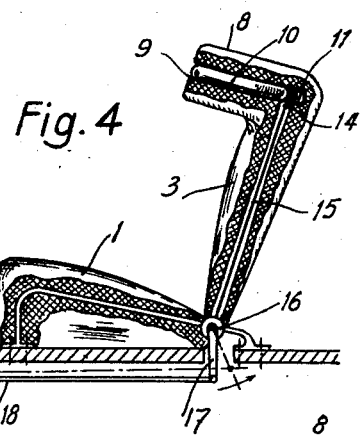
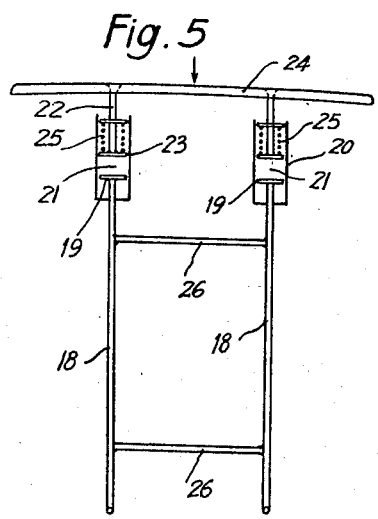
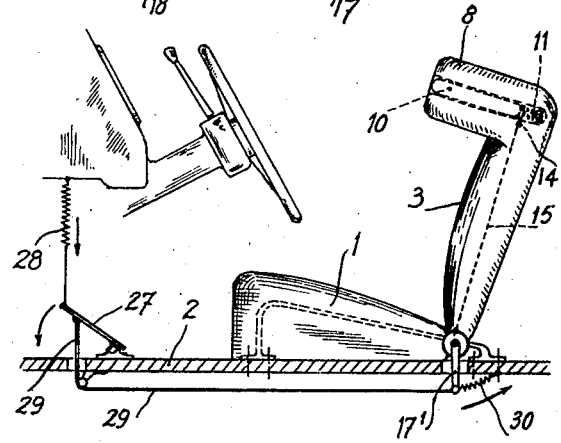

2,873,122

SAFETY SEAT FOR MOTOR VEHICLES

Lucien Péras, Billancourt, France, assignor to Regie Nationale des Usines Renault, Billancourt, France, and Roger Petrignani, La Rochelle, France Application October 9, 1956, Serial No. 614,843

Claims priority, application France October 17, 1955

6 Claims. (Cl. 280—29)

The invention relates to seats for motor vehicles, and to improvements in these seats which concern the safety of the passengers occupying them and which make it possible to reduce the risk of injury if the vehicle is subjected to violent shocks.

These improvements are concerned principally with the front seats of the vehicles, whose occupants are most exposed since if there is any impact they strike up against the steering wheel, the dashboard or the windscreen and the projecting accessories in general.

The improvements according to the invention consist mainly in arranging, on the back of each of the seats, curved arms which are retracted inside the seat normally and which are ejected by appropriate mechanisms which are subjected to the impact, in such a manner as to form a belt about the body of the passenger, holding him on his seat. The invention is also concerned with certain constructional details such as the mechanisms for controlling the release of the arms, which will be described more particularly hereinafter.

In the accompanying drawings:

Fig. 1 is a view of a wing-chair seat according to the invention;

Fig. 2 is a view from above of the same seat showing the details of the restraining arms and the passenger in position on the seat;

Fig. 3 is a side view of the seat, which has a back portion rockable within certain limits determined by stops;

Fig. 4 is a side view of the seat and a mechanism for controlling the release of the restraining arms, given by way of example;

Fig. 5 is a plan view of the bars controlling the mechanism for releasing the restraining arms and bumper shock-absorbers acting on these bars;

Fig. 6 shows a modified form of embodiment of the control arrangement for releasing the restraining arms.

Referring now to the drawings, and more particularly to Figs. 1, 2, 4 and 5, it will be seen that the seat 1 is fixed on the floor which is illustrated diagrammatically at 2. The back 3 of the seat is articulated relatively to the seat proper and is mounted on a transverse spindle 4 which is fixed on each side of the seat to a sector 5 which is fast with the floor. The free edge of this segment comprises two stops: a rear stop 6 against which the rear face of the seat rests normally at the level of a cross-member fast with the frame of the said seat. The other, forward stop 7 is situated so as to stop the seat back after this latter has rotated forwards through an angle of approximately 15°. This stop comes in contact with a front cross-member which is parallel the frame of the seat back.

Thus fixed and provided with a back whose ability to tilt forwards is strictly limited, this seat comprises at its upper end two side wings 8, 8¹ whose curves engage about the occupant's shoulders without however hampering his movements (Fig. 1). These wings are curved, in the form of segments of a circle whose center is the center of the passenger's shoulder (Fig. 2). Arranged in the thickness of these wings is a guide tube 9 in each of which can slide a curved arm 10 the length of which must be so calculated that the ejectable portion is considerably shorter than the total length, in order to retain the said arm in the tube after ejection. Inside the tube 9, a coil spring 11 is situated at the rear of each arm 10 and bears on the one hand against the rear end of the said arm 10 and on the other hand against a partition 12. The two partitions 12 on the rear of the seat back are connected together by struts 13.

The spring 11 is compressed by direct pressure on the arm 10 which is held in place at the end of its path of travel, after the spring has been compressed, by a trigger lever 14 of suitable type which engages automatically. The ejection of the arm 10 has the effect of taking the protecting arms out in front of the front portion of the shoulder and the upper portion of the arm and the outer half of the chest.

Fig. 4 illustrates by way of example a control apparatus by means of which the trigger levers 14 can be released in the event of violent shocks, in such a manner as to ensure the ejection of the restraining arms 10.

A cable 15 is fixed on the one hand to the trigger lever 14 and on the other hand to the upper part of the disc 16, mounted so as to be capable of rotating on the spindle 4 on which the back 3 can be tilted. Fixed to the said disc is a small rod 17 which extends through a slot in the floor 2 and is articulated to a rod 18 whose front widened end 19 is situated inside a casing 20 containing the shock-absorbing buffer 21. The latter is of any suitable type, operating with springs or hydraulically; in the form of embodiment illustrated by way of example in Fig. 4, the shock-absorber comprises a rod 22 which is capable of sliding in the casing 20 and whose rear end 23 is normally situated at a specific distance from the end 19 of the rod 18. The front end 24 of the rod 22 is integral with the bumper 24 situated at the front of the vehicle. A coil spring 25 of suitable form surrounding the rod 22 is mounted in the casing 20 between the front end of the said casing and the widened end 23.

It should be noted that it is possible to provide a single control for releasing the trigger levers 14 in each seat, the two levers 14 of each seat being connected together by a suitable transmission, in such manner that the release of one of the levers 14 by the cable 15 causes the release of the other lever.

It will be seen at once that a light shock inflicted on the bumper 24 will be absorbed by the shock-absorbers 21, the end 23 of the rod 22 not coming into contact with the end 19 of the rod 18.

On the contrary, a violent and therefore dangerous impact (after having been initially damped by the system 21), will bring the ends 19 and 23 of the rods 18 and 22 into contact with one another (Fig. 4) and bring about the operation of the system 18, 17, 16, 15 for releasing the levers 14.

In order to prevent a lateral impact from acting only against one part of the bumper and thus only causing one shock absorber to operate, the two rods 18 are connected together at the front and rear by two crossbars 26, the whole forming a rigid quadrilateral which gives more rigidity to the whole assembly and ensures the simultaneous operation of the two buffers (Fig. 5).

If the objection is raised that the movement of the mechanical parts which are used requires a fraction of a second, retarding, by however little, the ejection of the protecting arms, it is possible to provide an electrical control of the system by closing a circuit at the point of pressure of the buffer (when the end 23 thereof encounters a fixed member) immediately setting in movement a mechanism for releasing the trigger lever, for example by electromagnet means.

Finally, for the purpose of controlling the operation of the protective mechanism, and also to enable it to be brought into operation voluntarily before the shock proper, and also to cause it to operate in the case of accidents other than frontal shocks, it is possible to provide in addition to the mechanism already described, the following apparatus, which is illustrated in Fig. 6. An inclined foot board pedal 27 is arranged on the foot board at the required distance so that the passenger's feet can act on the said pedal. The latter is pivotally mounted on the floor and is held in its normal inclined position by the tension of an appropriately arranged spring 28. The pedal 27 is connected through an appropriate transmission to the small rod which acts on the cable 15 for releasing the levers 14.

In the example illustrated in Fig. 6, a cable 29 which is suitably guided and passes under the floor 2, acts on the small rod 17' controlling the cable 15. The small rod 17' is arranged on the opposite face of the disc 16 to that which receives the small rod 17. A restoring spring 30 is provided and mounted between the lever 17' and a fixed part. The small rod 17' is held in its position of equilibrium by the restoring spring 30, so that any pressure on the foot board pedal 27 relaxing the cable will displace the small rod 17' to the rear as in the case of the first system described (Fig. 4). At the driver's side, the foot board pedal is replaced by an eccentric pedal which is situated as far as possible from the clutch pedal so as to prevent any confusion.

It should be stressed that the forward rocking movement of the seat which was described hereinbefore, and the extent of which is strictly limited, is quite independent of the general invention. It would be quite easy to have an absolutely fixed back. But this forward movement of the seat back as a result of deceleration is considered advantageous since it allows the seat back to follow the similar movement of the occupant, whose own back does not leave the back of the seat.

In these conditions, even if there is a slight lag in the time which the system takes to operate, amounting to a fraction of a second, the protecting arms will nevertheless be in a satisfactory position to be able to come into the desired position without any danger of being caught and to fulfil their fundamental task of acting as a restraining belt which is concealed and which automatically comes into operation in the case of an accident.

I claim:

1. A safety seat for a vehicle comprising, a seat portion, a back rest provided with a substantially arcuately configured upper end portion for supporting the shoulders of a person in said seat, a pair of arcuately configured restraining arms telescopically movable into and from opposite ends of said upper shoulder-supporting portion, means arranged for selectively actuating said arms to extended position for partially encircling the person in the seat and restraining his movement away from the back rest, and automatic latch means for normally holding the restraining arms in a retracted position and for automatically releasing them incident to an impact of a predetermined force on the vehicle.

2. A safety seat for a vehicle comprising, a seat portion, a back rest pivotally mounted for limited forward pivotal movement incident to rapid deceleration of the vehicle, the back rest being provided with a substantially arcuately configured upper end portion for supporting the shoulders of a person in said seat, a pair of arcuately configured restraining arms telescopically movable into and from opposite ends of said upper shoulder-supporting portion, means arranged for selectively actuating said arms to extended position for partially encircling the person in the seat and restraining his movement away from the back rest, and automatic latch means for normally holding the restraining arms in a retracted position and comprising a mechanical mechanism for automatically releasing them incident to an impact of a predetermined force on the vehicle.

3. A safety seat for a vehicle comprising, a seat portion, a back rest pivotally mounted for limited forward pivotal movement incident to rapid deceleration of the vehicle, the back rest being provided with a substantially arcuately configured upper end portion for supporting the shoulders of a person occupying said seat, a pair of arcuately configured restraining arms telescopically movable into and from opposite ends of said upper shoulder-supporting portion, means arranged for selectively actuating said arms to extended position for partially encircling the person in the seat and restraining his movement away from the back rest, automatic latch means for normally holding the restraining arms in a retracted position and for automatically releasing them incident to an impact of predetermined force on the vehicle, and means operable by the vehicle driver for selectively releasing the restraining arms thereby to extend them.

4. A safety seat for a vehicle comprising, a seat portion, a back rest pivotally mounted for limited forward pivotal movement incident to rapid deceleration of the vehicle, the back rest being provided with a substantially arcuately configured upper end portion for supporting the shoulders of a person occupying said seat, a pair of arcuately configured restraining arms telescopically movable into and from opposite ends of said upper shoulder-supporting portion, means arranged for selectively actuating said arms to extended position for partially encircling the person in the seat and restraining his movement away from the back rest, and automatic latch means for normally holding the restraining arms in a retracted position and for automatically releasing them incident to an impact of predetermined force on the vehicle, and means selectively operable by the seat occupant for selectively releasing the restraining arms thereby to extend them.

5. A safety seat for a vehicle according to claim 3, in which said occupant-operated means comprises a foot pedal disposed accessible to said occupant.

6. A safety seat for a vehicle provided with a bumper comprising, a seat portion, a back rest pivotally mounted for limited forward pivotal movement incident to rapid deceleration of the vehicle, the back rest being provided with a substantially arcuately configured upper end portion for supporting the shoulders of a person in said seat, a pair of arcuately configured restraining arms telescopically movable into and from opposite ends of said upper shoulder-supporting portion, means arranged for selectively actuating said arms to extended position for partially encircling the person in the seat and restraining his movement away from the back rest, and automatic latch means for normally holding the restraining arms in a retracted position and including bumper actuated means for automatically releasing them incident to an impact of predetermined force on the vehicle bumper.

References Cited in the file of this patent

UNITED STATES PATENTS

| | | |
|---|---|---|
| 2,335,340 | Koppelman | Nov. 30, 1943 |
| 2,705,529 | Bull et al. | Apr. 5, 1955 |
| 2,736,566 | Hartl | Feb. 28, 1956 |
| 2,777,531 | Erickson | Jan. 15, 1957 |
| 2,789,650 | Krous | Apr. 23, 1957 |